(12) United States Patent
Shu et al.

(10) Patent No.: US 11,823,364 B1
(45) Date of Patent: Nov. 21, 2023

(54) MACHINE LEARNING FOR ARTIFICIAL PARCEL DATA GENERATION

(71) Applicant: Ecopia Tech Corporation, Toronto (CA)

(72) Inventors: Yuanming Shu, Toronto (CA); Shuo Tan, Campbell, CA (US); Hongbo Wang, Hebi (CN)

(73) Assignee: Ecopia Tech Corporation, Toronto (CA)

( * ) Notice: Subject to any disclaimer, the term of this patent is extended or adjusted under 35 U.S.C. 154(b) by 0 days.

(21) Appl. No.: 18/105,589

(22) Filed: Feb. 3, 2023

Related U.S. Application Data

(60) Provisional application No. 63/482,324, filed on Jan. 31, 2023, provisional application No. 63/479,282, filed on Jan. 10, 2023.

(51) Int. Cl.
*G06T 5/50* (2006.01)
*G06F 16/29* (2019.01)
*G06V 20/10* (2022.01)

(52) U.S. Cl.
CPC .............. *G06T 5/50* (2013.01); *G06F 16/29* (2019.01); *G06V 20/176* (2022.01); *G06T 2207/20221* (2013.01)

(58) Field of Classification Search
CPC . G06T 5/50; G06T 2207/20221; G06F 16/29; G06V 20/176; G06V 10/22; G06V 10/25; G06V 10/44; G06V 10/82; G06V 20/188; G06V 20/194; G01S 13/902
See application file for complete search history.

(56) References Cited

U.S. PATENT DOCUMENTS

| | | | |
|---|---|---|---|
| 10,015,359 B1 | 7/2018 | Kurzhanskiy et al. | |
| 10,664,702 B2 | 5/2020 | Albrechet et al. | |
| 11,367,278 B2 | 6/2022 | Wilson et al. | |
| 11,393,194 B2 | 7/2022 | Marvaniya et al. | |
| 2003/0099406 A1* | 5/2003 | Georgiev | G06T 5/20 382/268 |
| 2017/0084037 A1* | 3/2017 | Barajas Hernandez | G06V 10/462 |
| 2019/0279051 A1* | 9/2019 | Martinello | G06F 18/241 |

OTHER PUBLICATIONS

Park et al., "Creating 3D city models with building footprints and LIDAR point cloud classification: a machine learning approach" publishes Jan. 28, 2019. (Year: 2019).*
Sahu et al., "Vector Map Generation From Aerial Imagery Using Deep Learning", pub. Jun. 2019. (Year: 2019).*
Ziming Li et al.,"A Deep Learning-Based Framework for Automated Extraction of Building Footprint Polygons from Very High-Resolution Aerial Imagery" pub. Oct. 11, 2021, (Year: 2021).*

* cited by examiner

*Primary Examiner* — Mekonen T Bekele
(74) *Attorney, Agent, or Firm* — Andrew J. Tibbetts; Greenberg Traurig, LLP

(57) ABSTRACT

Methods and systems for generating artificial parcel data are provided. An example method involves accessing geospatial imagery depicting one or more buildings and surrounding areas, applying a machine learning model to the geospatial imagery to generate artificial parcel data in a form of a distance-transform raster map that represents a legal land parcel for each of the one or more buildings, and converting the distance-transform raster map into a vector map containing one or more polygons that represent the boundaries of each of the legal land parcels.

21 Claims, 14 Drawing Sheets

MACHINE LEARNING FOR ARTIFICIAL PARCEL DATA GENERATION

CROSS-REFERENCE TO RELATED APPLICATIONS

This application claims the benefit under 35 U.S.C. § 119(e) of U.S. Provisional App. 63/482,324, filed Jan. 31, 2023, and U.S. Provisional App. 63/479,282, filed Jan. 10, 2023. The contents of each of the aforementioned applications are incorporated herein by reference in their entirety.

BACKGROUND

Geospatial information is commonly presented as raster data or as vector data. Raster data presents an area of the world as a regular grid of cells, with attributes associated with each cell. A common example of geospatial information presented as raster data is an aerial image. Raster data can also be used to present semantic information extracted from imagery (i.e., raster labels) such as in land classification maps. In contrast, vector data can be used to present semantic information extracted from imagery as a set of geometric entities (e.g., polygons, lines, points) with associated attributes. A common example of geospatial information presented as vector data is building footprint data, which represents the shapes and geospatial locations of buildings in an area. Vector data may be preferred over raster data in many applications for scalability, compactness, and the ease with which vector data can be edited and manipulated.

A legal land parcel describes the definite location and boundaries of a plot of land. In recent years, some municipalities and other organizations have begun to digitize records of land parcel data. Legal land parcel data may be stored as a raster map, in which each pixel of the raster map is labeled as belonging to a particular legal land parcel. Land parcel data may also be stored as a vector map, in which each land parcel is represented as a polygon, with the edges of the polygon forming the boundaries of the parcel.

DETAILED DESCRIPTION

Digitized legal land parcel data may be valuable information for a variety of purposes. However, such data tends to be highly decentralized in its availability. Parcel data typically originates with the municipal or regional government organizations that are bestowed the legal responsibility of creating and maintaining records of legal land parcels. These legal records may or may not always be digitized, meaning that any provider of geospatial information which aims to serve a large geographic area may have to service some areas where digitized parcel data is not readily available. For areas where such records are digitized, the organizations offering such data may not make the data available for commercial purposes. Where digital records are available for commercial purposes, access to such data may be costly.

Further, unlike physical landcover, such as roads, trees, and buildings, which may be directly depicted in geospatial imagery, legal land parcels have boundaries which are legal constructs and which are not depicted directly in geospatial imagery. Rather, the boundaries of legal land parcels tend to be loosely demarcated by a multitude of markers, if any, such as roads, fences, tree lines, or other features that may indirectly suggest the boundaries of legal land parcels. Although land parcels may not be directly discernable from geospatial imagery, a machine learning model may be trained to recognize the landcover features that tend to demarcate such boundaries. Such artificially-generated parcel data may be used where no ground truth land parcel data is readily available.

The present disclosure therefore teaches methods to train and apply machine learning models to extract artificial parcel data from geospatial imagery. The present disclosure also teaches methods for efficiently processing large areas of geospatial imagery for which there is mixed coverage of ground truth parcel data (i.e., areas where ground truth parcel data for some buildings, but not all buildings, is available). The present disclosure also teaches methods for converting parcel data between vector format and raster format for both training and production purposes.

The machine learning model that is applied may comprise a deep learning architecture. Such a machine learning model may be trained to recognize, across a broad range of contexts, the visual features that tend to demarcate legal land parcel boundaries, such as fences, roads, curbs, tree lines, and other features that tend to be visible in geospatial imagery, to produce artificial parcel data.

Figure 1:
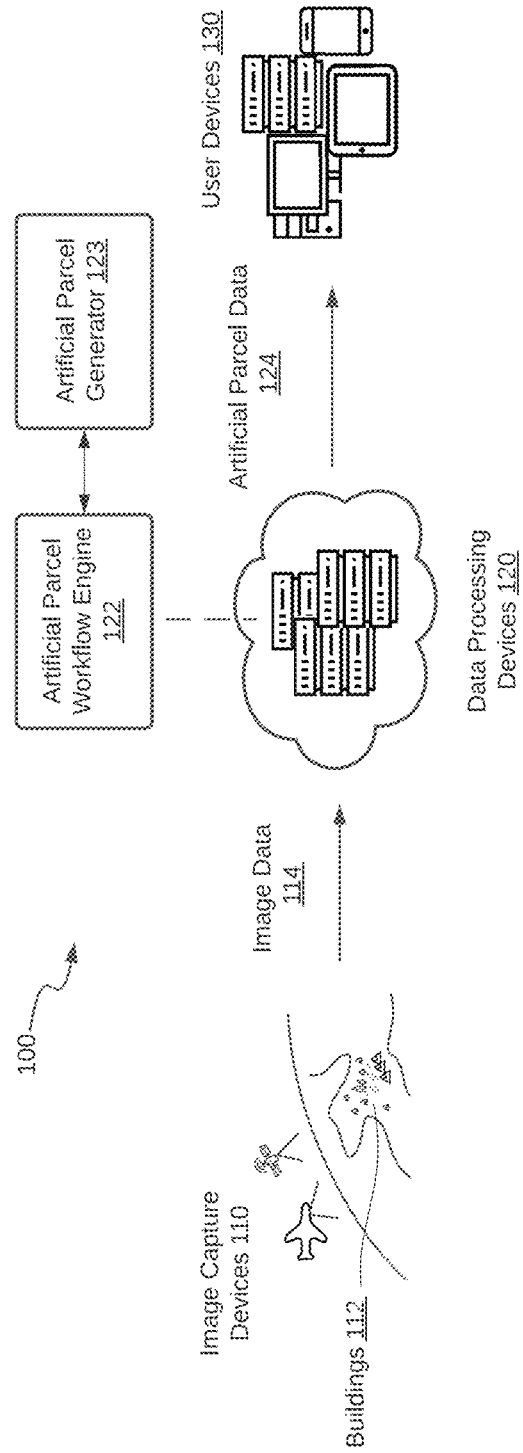
FIG. 1 is a schematic diagram of an example system for generating artificial parcel data.

FIG. 1 is a schematic diagram of an example system 100 for generating artificial parcel data. The system 100 includes one or more image capture devices 110 to capture image data 114 over an area of interest containing one or more buildings 112. An image capture device 110 may include any suitable sensor (e.g., camera) onboard an aircraft, satellite, drone, observation balloon, or other device capable of capturing imagery of an area of interest from an overhead point of view (i.e., geospatial imagery). In particular, such an image capture device 110 should be capable of capturing an overhead view of the buildings 112 and the surrounding areas from a sufficient height that the captured imagery is likely to cover the entire legal land parcels occupied by those buildings 112.

The image data 114 may comprise the raw image data captured by such image capture devices 110 along with any relevant metadata, including camera parameters (e.g., focal length, lens distortion, camera pose, resolution), geospatial projection information (e.g., latitude and longitude position), or other relevant metadata. The type of imagery captured may include substantially nadir imagery, off-nadir imagery, or oblique imagery, or a combination thereof, as appropriate. The image data 114 may contain several batches of imagery covering the same area, from different points of view, which may have been captured on the same dates, or on different dates.

The system 100 further includes one or more data processing devices 120 to process the image data 114 to generate artificial parcel data 124 as described herein. The data processing devices 120 include one or more computing devices, such as virtual machines or servers in a cloud computing environment comprising one or more processors for executing computing instructions. In addition to processing capabilities, the data processing devices 120 include one or more communication interfaces to receive/obtain/access the image data 114 and to output/transmit artificial parcel data 124 through one or more computing networks and/or telecommunications networks such as the internet. Such computing devices further include memory (i.e., non-transitory machine-readable storage media) to store programming instructions that embody the functionality described herein.

The one or more data processing devices 120 are configured to run (i.e., store, host or access) an artificial parcel workflow engine 122 and an artificial parcel generator 123, which represent functional units that may comprise one or more programs, software modules, or other set of non-transitory machine-readable instructions, to carry out the functionality described herein. Although described in more detail throughout the disclosure, the artificial parcel workflow engine 122 is configured to process geospatial imagery, ground truth parcel data, and building footprint data to determine areas in which artificial parcel data 124 may be required, and cooperates with the artificial parcel generator 123 to generate such artificial parcel data 124. The artificial parcel generator 123 includes a machine learning model and other functional units to generate artificial parcel data 124 based on the provided geospatial imagery.

In some cases, the data processing devices 120 may perform imagery pre-processing where necessary to prepare the received image data 114 for processing by the artificial parcel workflow engine 122 or artificial parcel generator 123. For example, one or more aerial or satellite images may be processed to form an orthomosaic to be used in the later stages of artificial parcel generation.

The data processing devices 120 may provide such artificial parcel data 124 to one or more user devices 130. A user device 130 may include one or more computing devices configured to run (i.e, store, host or access) one or more software programs to display, process, or otherwise use the artificial parcel data 124 (e.g., a GIS viewer). In some examples, a user device 130 may include a display device and user interface and may allow a user to view and manipulate the artificial parcel data 124.

Figure 2:
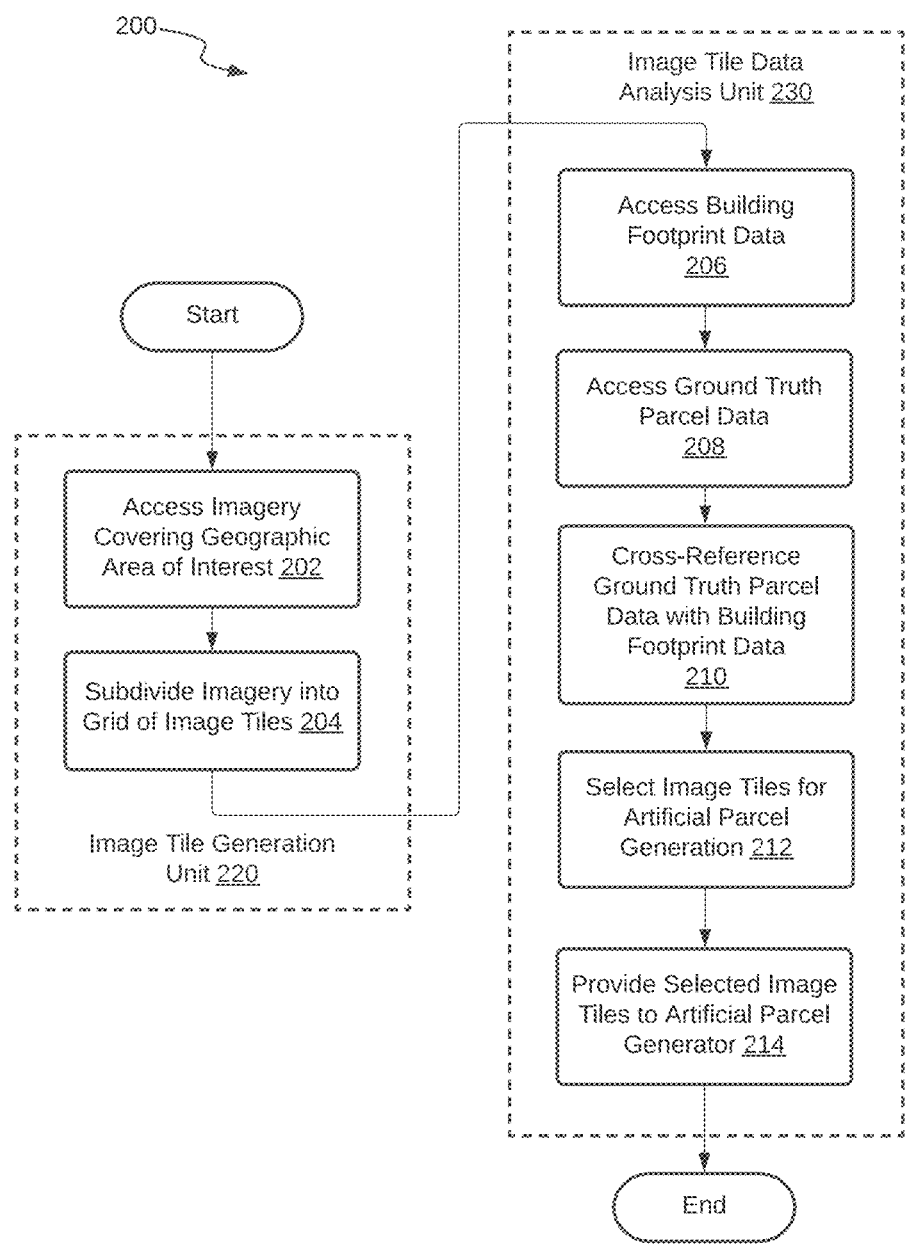
FIG. 2 is a flowchart of an example method for preparing geospatial imagery for artificial parcel generation.

FIG. 2 is a flowchart of an example method 200 for preparing geospatial imagery for artificial parcel generation. The method 200 may be understood as describing one example method for how the artificial parcel workflow engine 122 of FIG. 1 may operate, and in particular, how it may process geospatial imagery, ground truth parcel data, and building footprint data, and cooperate with the artificial parcel generator 123 of FIG. 1 to generate artificial parcel data 124.

The method 200 involves subdividing a large area of geospatial imagery into smaller image tiles and performing various data processing tasks, sometimes involving other data sources, on these image tiles. Performing such data processing tasks on image tiles rather than the entire image set may be more manageable and better suited to parallel processing. For illustrative purposes, the method 200 is therefore described as being performed by two broad functional units, namely an image tile generation unit 220 and an image tile data analysis unit 230. However, this depiction is for illustrative purposes only, and it is emphasized that the operations described in method 200 may be performed by any combination of one or more functional units, software systems, sets of non-transitory machine-readable instructions, and/or computing devices.

At operation 202, the image tile generation unit 220 accesses geospatial imagery covering a geographic area of interest. The geospatial imagery may comprise, for example, a single aerial or satellite image, an orthophoto, or an orthomosaic generated from several images. In most cases, it is expected that the following data processing and artificial parcel generation will begin with an orthomosaic that covers a large geographic area of interest. Such geospatial imagery will depict at least one building for which artificial parcel data is to be generated, but generally, a very large number of buildings will be depicted. For some of these buildings, ground truth parcel data that accurately describes the boundaries of the legal land parcels occupied by such buildings may be readily available by third parties. However, ground truth parcel data may not be available for all buildings. The task then becomes dividing the geospatial imagery into smaller areas where it is necessary to generate artificial parcel data. For illustrative purposes, reference may be had to FIG. 3A, which depicts a geospatial image 302 containing several buildings 303 and further depicts other various landcover features.

At operation 204, the image tile generation unit 220 subdivides the geospatial imagery into a grid of image tiles. Such a grid of image tiles may be a regular grid of equally sized cells of any appropriate dimensions. For example, geospatial imagery covering an area of interest of about 500 km by 500 km may be split into image tiles of about 1 km by 1 km each. However, any dimensions may be used as may be appropriate to the geographic area of interest and other factors. Such a grid may be established with reference to the geospatial information contained in metadata of the geospatial imagery (e.g., geospatial coordinates, image scale, resolution, etc.).

For convenience, and for future use, each image tile in the grid of image tiles may be assigned a unique identifier. Typically, such a unique identifier may in part be based on the position of each image tile in an XY coordinate system established by the grid. For example, each image tile may be assigned an identifier such as "image_tile_5.3", "image_tile_250.07". In some examples, a unique identifier for an image tile may contain other contextual information such as a date of image capture, e.g., "tile_2022.12.31.240.360", which may be useful when updating artificial parcel data. For illustrative purposes, reference may be had to FIG. 3A, which depicts a grid of image tiles 304, established over the geospatial image 302, with XY axis labeled.

Each image tile may be associated with image data pertaining to the area covered by the image tile. For example, each image tile may be associated with not only the imagery that covers its area, but also associated with the associated camera parameters of the cameras used to capture such imagery, including image scale, capture date, and other metadata that may be useful in further downstream processing.

Figure 3A:
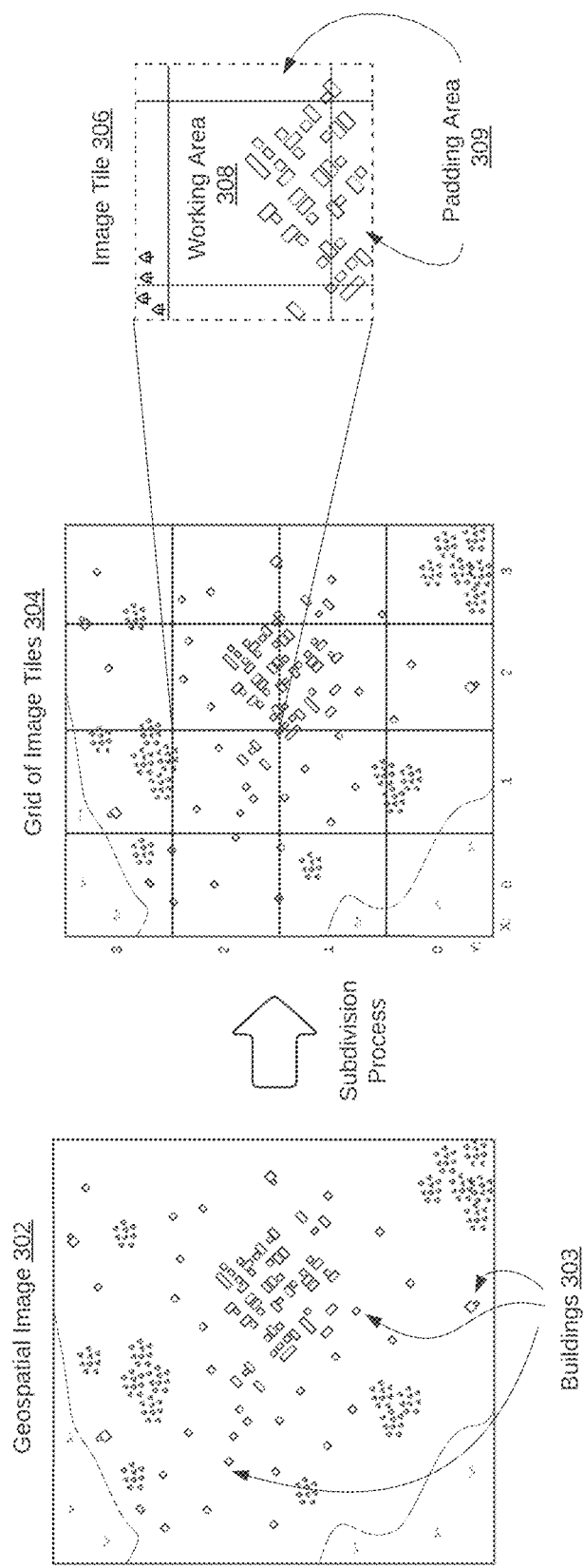
FIG. 3A is an illustration of an example geospatial image covering a geographic area of interest to be prepared for artificial parcel generation.

It should be apparent that in many cases (e.g., as depicted in the grid of image tiles 304), some of the buildings in the geospatial imagery may lie near a boundary between adjacent image tiles or may even fall directly on a boundary between adjacent image tiles. When processing image tiles independently, it may be desirable to incorporate some surrounding context from adjacent image tiles. Therefore, in some examples, as depicted in FIG. 3A, which shows a close-up of one of the image tiles 306, each image tile may comprise both a working area 308 (defined by the grid structure of the grid of image tiles 304) and a surrounding padding area 309 that surrounds one or more sides of the working area 308 of the image tile 306 and overlaps the working areas of one or more adjacent image tiles. Thus, for example, whereas the working area 308 may cover a 1 km×1 km area, the padding area 309 may span an additional 0.2 km in each direction, and therefore the image tile 306 may comprise a total area of 1.4 km×1.4 km. This padding area 309 may be useful for providing additional context around the working area 308 so that artificial parcel data may be properly generated for buildings on or near a boundary between adjacent tiles.

At operation 206, the image tile data analysis unit 230 accesses building footprint data for the buildings depicted in the geospatial imagery. This building footprint data may be useful to determine which areas require artificial parcel generation. Such building footprint data is georeferenced to the geospatial imagery and represents positions and shapes of the buildings contained in the geographic area of interest. In other words, the building footprint data geospatially outlines the boundaries of the buildings 303 depicted in FIG. 3A.

The building footprint data may be obtained by a third-party data provider, or may be generated directly, by, for example, one or more additional functional units that are run by the one or more data processing devices 120 of FIG. 1. Preferably, the building footprint data is generated based on the same geospatial imagery that is being used to generate artificial parcel data, to ensure geospatial alignment of building footprints and parcel data and temporal accuracy. However, in other cases, the building footprint data can be generated from other imagery and aligned to the geospatial imagery being used for artificial parcel generation by aligning geospatial coordinates in the respective data sets.

The building footprint data may be in the form of labeled raster data (i.e., a raster map with each pixel labeled with a unique identifier for the building it belongs to) or vector data (i.e., as vector map comprising polygons labeled with unique identifiers for each building). In many cases, building footprint data in the form of vector data may be preferred for scalability, compactness, and manipulability. In some examples, the building footprint data may have been extracted directly from geospatial imagery by a machine learning process, such as the process described in in U.S. patent application Ser. No. 17/731,769, entitled MACHINE LEARNING FOR VECTOR MAP GENERATION, filed Apr. 28, 2022, the entirety of which is hereby incorporated by reference.

At operation 208, the image tile data analysis unit 230 accesses ground truth parcel data representing the boundaries of known legal land parcels defined within the geographic area of interest. That is, the ground truth parcel data defines the known shapes and geospatial positions of the legal land parcels of at least some of the buildings 303 depicted in the geospatial image 302 in FIG. 3A. As with the building footprint data, the ground truth parcel data contains geospatial information such that each legal land parcel can be geospatially aligned with the geospatial image 302 (and the building footprint data). The ground truth parcel data will generally be obtained from a third party who provides access to official legal land parcel data in a digitized format. The ground truth parcel data may be in the form of labeled raster data (i.e., a raster map with each pixel labeled with a unique identifier for the parcel it belongs to) or vector data (i.e., as vector map comprising polygons labeled with unique identifiers for each parcel). In many cases, parcel data in the form of vector data may be preferred for scalability, compactness, and manipulability.

Figure 3B:
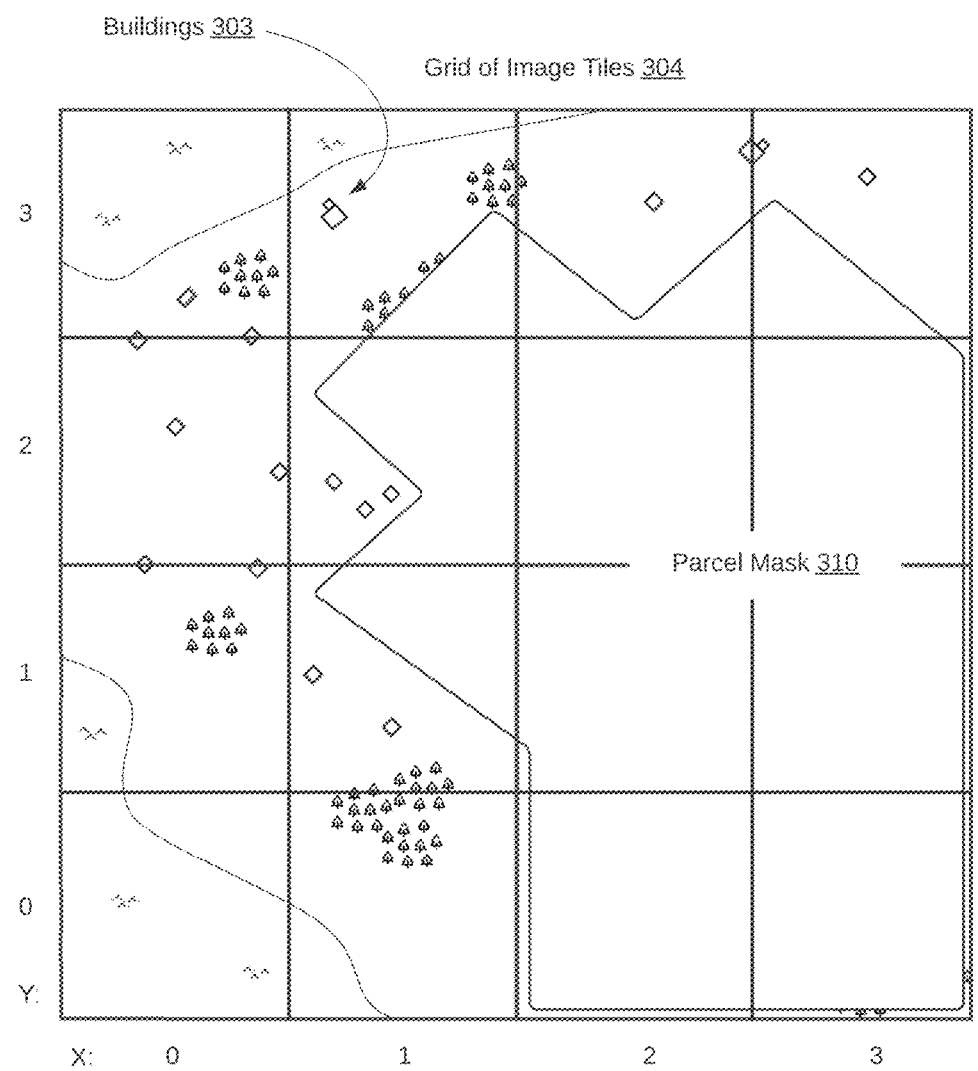
FIG. 3B is an illustration of the geospatial image of FIG. 3A overlaid with an example mask of ground truth parcel data.

At operation 210, the image tile data analysis unit 230 cross-references the ground truth parcel data with the building footprint data to identify buildings that are located in areas that are not labeled by ground truth parcel data. In other words, the image tile data analysis unit 230 identifies those image tiles which contain buildings for which there is no ground truth parcel data available. This cross-referencing may involve a comparison of the geospatial information associated with the building footprint data and the ground truth parcel data to determine building footprints with geospatial coordinates that do not fall within any ground truth parcel data. Such buildings may be identified as buildings for which artificial parcel data is to be generated. For illustrative purposes, reference may be had to FIG. 3B which shows the grid of image tiles 304 with a parcel mask 310 overlaid which covers the areas where there is ground truth parcel data available. There remain several buildings 303 which are not covered by the ground truth parcel data.

Figure 3C:
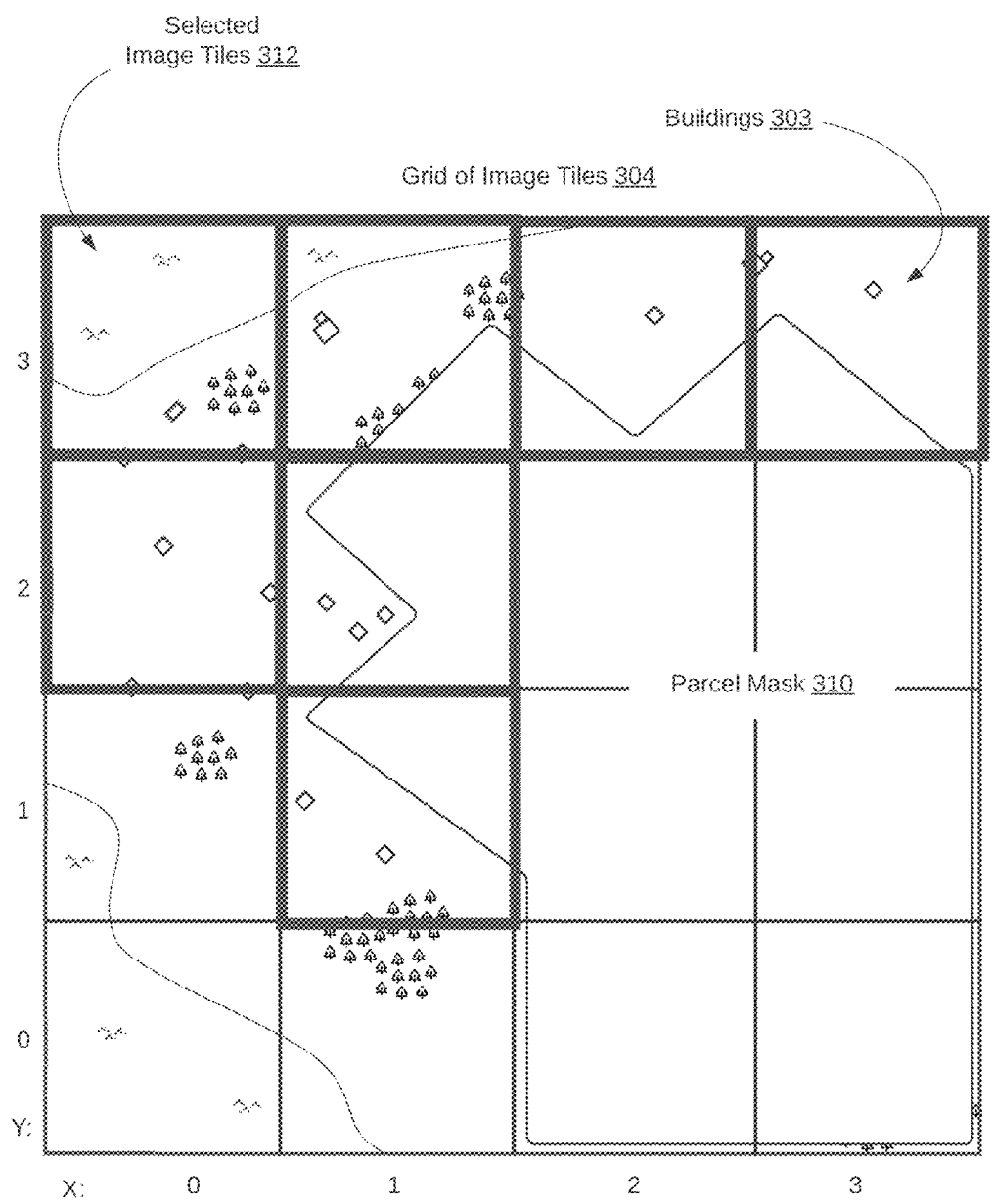
FIG. 3C is an illustration of the geospatial image of FIG. 3A overlaid with the mask of ground truth parcel data of FIG. 3B, further indicating image tiles that are selected for artificial parcel generation.

At operation 212, the image tile data analysis unit 230 selects, based on the results of the cross-referencing, one or more image tiles that contain buildings for which no ground truth parcel data is available. Selecting such image tiles may involve a comparison of the geospatial information associated with the image tiles and the building footprints identified for artificial parcel generation to determine which image tiles such building footprints fall within. For illustrative purposes, reference may be had to FIG. 3C, which shows the grid of image tiles 304 with several selected image tiles 312 indicated. The selected image tiles 312 contain the building footprints that are not covered by ground truth parcel data and which are therefore selected for artificial parcel generation.

Figure 3D:
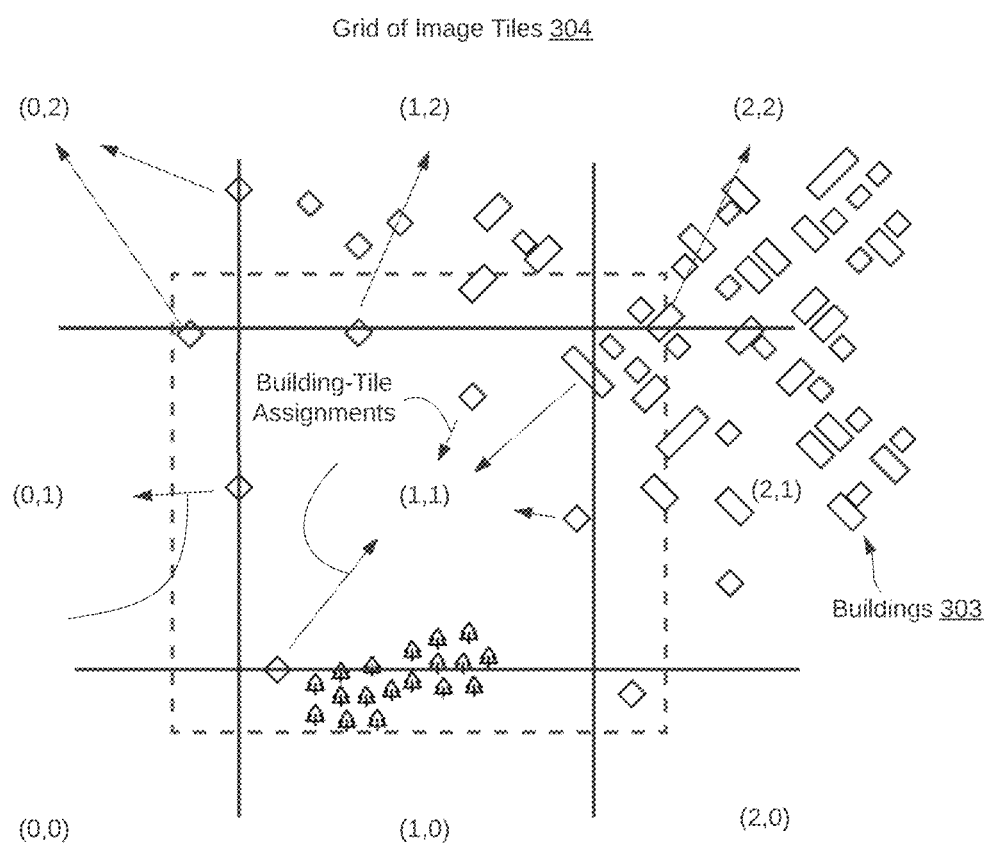
FIG. 3D is a close-up of a portion of the geospatial image of FIG. 3A, divided into image tiles, and depicting example assignments of buildings to image tiles.

As described above, in many cases, some of the buildings in the geospatial imagery may fall directly on a boundary between adjacent image tiles. Thus, in order to determine which image tiles should be selected as areas requiring artificial parcel generation, it may be necessary as a prerequisite step to assign such buildings to one image tile another. Therefore, the method 200 may involve a process by which buildings represented in the building footprint data are assigned to one of the image tiles in the grid of image tiles. In the simplest case, each building footprint that is contained entirely within an image tile may be assigned to the image tile in which it is contained. However, to capture the edge cases, such an assignment process may involve applying one or more heuristics for assigning buildings that are situated on a boundary between adjacent image tiles. Any suitable algorithm or set of heuristics for uniquely assigning buildings to image tiles may be appropriate. For example, where a building overlaps two or more image tiles, the building may be assigned to the image tile with the highest XY coordinate in the XY coordinate system established by the grid of image tiles. In another example, as shown in FIG. 3D, buildings 303 that cross the bottom or right border of an image tile are assigned to that image tile, whereas buildings 303 that cross the top or left border of an image tile are assigned to the other image tile.

At operation 214, the image tile data analysis unit 230 provides the selected image tiles to an artificial parcel generator (e.g., artificial parcel generator 123 of FIG. 1) to generate artificial parcel data representing estimated boundaries of legal land parcels occupied by the identified buildings. At the artificial parcel generator, a machine learning model may be applied to generate artificial parcel data representing the estimated boundaries of legal land parcels occupied by the buildings with no ground truth parcel data, as will be described in greater detail later in this disclosure.

It is to be noted that the sequence in which the operations of the method 200 are ordered is exemplary only, and that in some cases, the order of these operations may be different. For example, operation 204 in which the geospatial imagery is subdivided into a grid of image tiles may take place after building footprint data has been cross-referenced against parcel data as a whole (and indeed, in such a case, the image tile generation unit 220 may be tasked with subdividing only a smaller area covered by the geospatial imagery where it is necessary to divide the imagery into image tiles). Cross-referencing an entire dataset of parcel data against an entire dataset of building footprint data may be more feasible when both datasets are in a vector data format. As another example, the assignment of buildings to image tiles may take place immediately after division of the geospatial imagery into the grid of image tiles, but also may take place at any other suitable point in time, prior to selection of image tiles for artificial parcel generation.

It is to be noted that the method 200 and/or any of its operations may be embodied in non-transitory machine-readable programming instructions executable by one or more processors of one or more computing devices, such as servers in a cloud computing environment, which include memory to store programming instructions that embody the functionality described herein and one or more processors to execute the programming instructions.

Figure 4:
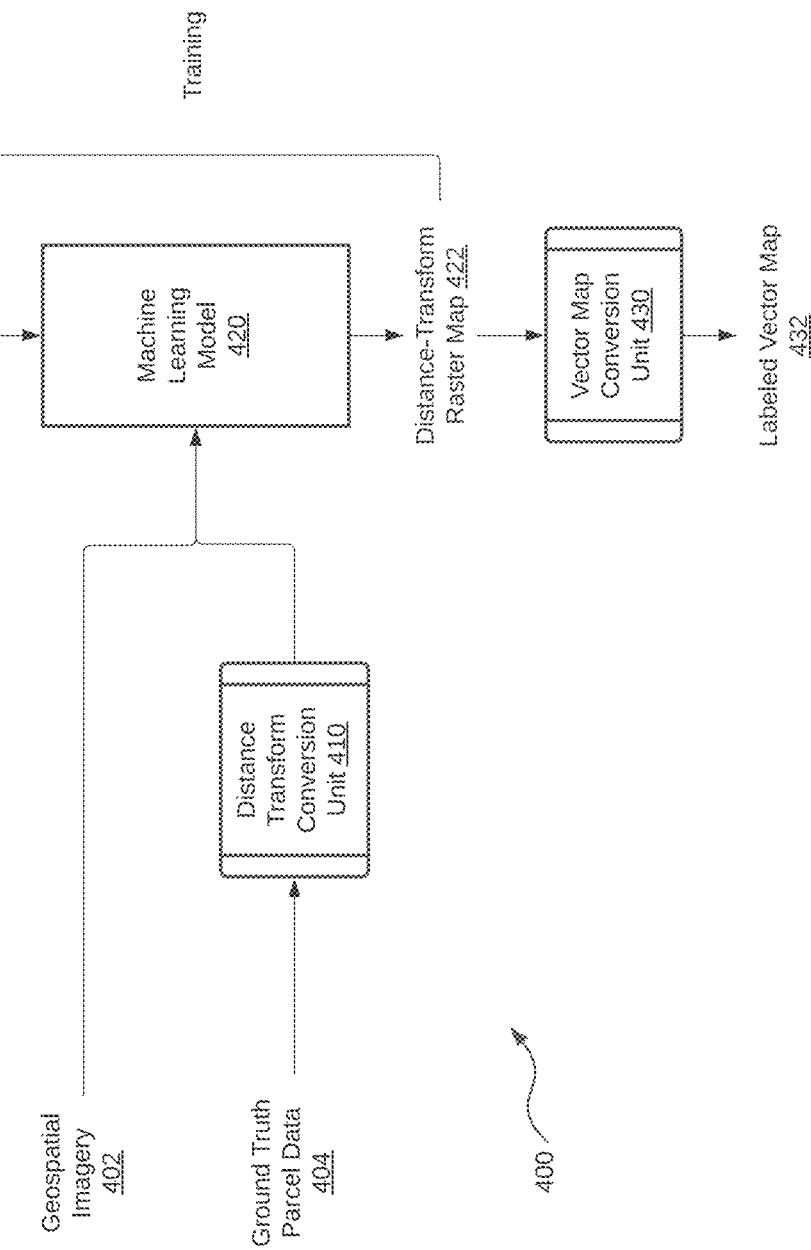
FIG. 4 is a schematic diagram depicting an example artificial parcel generator including a machine learning model.

FIG. 4 is a schematic diagram depicting an example artificial parcel generator 400. The artificial parcel generator 400 may be understood as describing one example of how the artificial parcel generator 123 of FIG. 1 may be structured. The artificial parcel generator 400 includes a machine learning model 420 that is trained on geospatial imagery 402 and ground truth parcel data 404 to generate a distance-transform raster map 422 that is then converted into a labeled vector map 432 comprising artificial parcel data. The machine learning model 420 may be structured in any suitable deep learning architecture, including one or more neural networks, one or more convolutional neural networks, including one or more U-Net convolutional networks.

During training, the distance-transform conversion unit 410 operates to convert the ground truth parcel data 404 into a distance-transform raster map which is used to train the machine learning model 420. In cases where the ground truth parcel data 404 is in the form of a labeled raster map (i.e., a raster map in which each pixel is labeled as belonging to a particular parcel), the ground truth parcel data 404 may be converted directly into its distance-transform format. In cases where the ground truth parcel data 404 is in the form of a labeled vector map (i.e., a vector map comprising polygons labeled as belonging to a particular parcel), the ground truth parcel data 404 may first be converted into a basic raster format (e.g., a raster map with labels for each parcel) and then converted into its distance-transform format.

The distance-transform raster map version of the ground truth parcel data 404 is a raster map in which each pixel of the raster map is attributed with a distance to the nearest boundary of the nearest legal land parcel. This distance-transform raster map of ground truth parcel data 404 may be combined with the corresponding geospatial imagery 402 covering the same area of interest (which may be referred to as training imagery) to train the machine learning model 420 to generate, in operation, new distance-transform raster maps 422 based on newly presented geospatial imagery 402. Further processes for preparing training data to train the machine learning model 420 are described in greater detail below.

In operation, the vector map conversion unit 430 operates to convert the generated distance-transform raster maps 422 into labeled vector maps 432. Conversion of a distance-transform raster map 422 into a labeled vector map 432 may first involve converting the distance-transform raster map 422 into a labeled raster map (i.e., a raster map in which each pixel is labeled as belonging to a particular parcel), and converting the labeled raster map into a labeled vector map (i.e., a vector map comprising polygons labeled as belonging to a particular parcel). These processes are described in greater detail below in FIG. 5.

Returning to FIG. 4, it is to be noted that, for illustrative purposes, the distance-transform conversion unit 410, the vector map conversion unit 430, and the machine learning model 420 are depicted as three distinct functional units. However, this depiction is for illustrative purposes only, and it is emphasized that the functionality described herein may be achieved by any combination of one or more functional units, software systems, sets of non-transitory machine-readable instructions, and/or computing devices.

Figure 5:
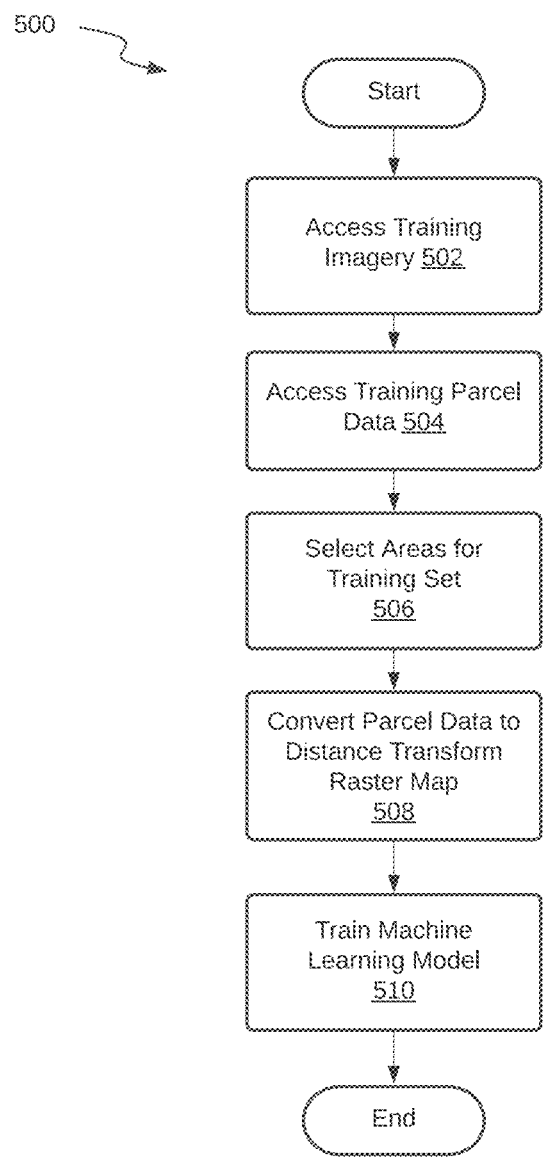
FIG. 5 is a flowchart of an example method for preparing training data to train a machine learning model to generate artificial parcel data.

FIG. 5 is a flowchart of an example method 500 for preparing training data to train a machine learning model to generate artificial parcel data. The method 500 may be understood as describing one example of how training data may be prepared to train the machine learning model 420 of the artificial parcel generator 400 of FIG. 4. Here, areas of geospatial imagery where there is sufficient coverage of ground truth parcel data are identified and provided to the machine learning model along with the associated geospatial imagery as training data.

At operation 502, geospatial imagery covering a geographic area (i.e., training imagery) is accessed. Such geospatial imagery will generally depict one or more buildings for which ground truth parcel data may or may not be available. For illustrative purposes, reference may be had to FIG. 6A which shows a geospatial image 602 containing several buildings 603 and other landcover features.

In some cases, where the geospatial imagery covers a large area of interest that may be infeasible to be processed by a machine learning model directly, the geospatial imagery may be subdivided into a grid of image tiles (e.g., similar to as described with reference to operation 204 of the method 200 of FIG. 2), so that training of the machine learning model may be divided into more easily manageable tasks. In addition to processing individual image tiles, the machine learning model may operate using smaller sliding windows of any suitable size, depending on the architecture of the machine learning model. For illustrative purposes, reference may be had to FIG. 6A which shows a grid of image tiles 604 established over the geospatial image 602.

At operation 504, ground truth parcel data representing known legal land parcels in at least some of the area covered by the training imagery (i.e., training parcel data) is accessed. In some cases, where the geospatial imagery is divided into image tiles, the training parcel data may completely cover some of the image tiles, and may only partly cover some of the remaining image tiles. The amount of coverage may be determined by a comparison of the geospatial information associated with the training parcel data to the geospatial boundaries defined for each image tile. For illustrative purposes, reference may be had to FIG. 6A, which shows the grid of image tiles 604 with training parcel data 610 overlaid. Some of the image tiles are fully covered, partially covered, and not at all covered by the training parcel data 610.

At operation 506, the areas covered by training imagery that contain sufficient coverage of training parcel data are selected as the set of training data. This selection may involve cross-referencing the training parcel data with the training imagery to identify image tiles that are sufficiently filled with training parcel data according to selection criteria.

In some examples, only the image tiles which are entirely filled with training parcel data may be used as training data. This selection criteria may simplify training of the machine learning model in that there is no need to configure the machine learning model to ignore (or otherwise handle) unparcelled areas. For illustrative purposes, reference may be had to FIG. 6A, which shows the grid of image tiles 604 and a set of selected image tiles 606 which are completely filled with training parcel data 610.

In other examples, image tiles which at least contain partial coverage of training parcel data (e.g., above a certain threshold), may be included as training data. In such cases, the machine learning model may be configured to ignore the unparcelled areas during (e.g., by applying a mask).

At operation 508, the training parcel data within the selected areas is converted into a distance-transform raster map. Such a distance-transform raster map represents the distance from each pixel of the raster map to the nearest boundary of a legal land parcel. The following further description of operation 508 may be understood to be one example of how the distance-transform conversion unit 410 of FIG. 4 may operate.

Generally, ground truth parcel data will be provided in vector format, and in such cases, converting the parcel data to its distance-transform format may involve first converting the parcel data from a labeled vector format to a labeled raster format. After conversion into a labeled raster map, a distance comparison may be made with reference to the original parcel data in vector format. A raster map may then be labeled according to which pixels lie on, inside, and outside the boundary of a parcel. First, each pixel which lies on a line segment represented in the vector data is labeled as falling on a boundary of a parcel. Second, for each remaining pixel inside a parcel, a searching process may be applied to determine the nearest pixel that falls on the boundary of a parcel. Third, a distance between such pixels may be calculated, and assigned to the pixel inside the parcel (e.g., the distance being based on the number of steps required in the X and/or Y direction to reach the border pixel). If any pixels fall outside of any parcel, steps two and three may be repeated for these pixels as well.

As a result, a complete raster map of the area is generated containing pixels that are attributed as belonging inside, outside, or on the border of a parcel, along with a distance to the nearest border for those pixels inside and outside of a parcel. Pixels contained inside a legal land parcel may be assigned a particular sign (e.g., negative or positive), whereas the pixels contained outside of any legal land parcel may possess the opposite sign. Pixels that lie on the boundary between legal land parcels (or between a legal land parcel and an area for which no parcel data is available) may be attributed as zero. In some examples, distance attributes may be truncated at a threshold value (e.g., from −10 to +10), to simplify machine learning. Depending on the configuration of the machine learning model, an offset may be applied to the distance transform so that a positive range of distance attributes reflect the full range of distances inside and outside parcel boundaries (e.g., −10/+10 offset by 10 to 0/+20), which may simplify the machine learning process.

Although represented above as a simple raster map, the distance transform raster map may in fact be generated by the machine learning model in the form of a probability distribution across a range of multiple distance channels. For example, using a sliding window of 256×256 pixels, the distance transform raster map may have dimensionality 256×256×21, with each channel representing a probability of a pixel being a certain distance from the nearest parcel border (e.g., −10 m, +10 m, or 0 m).

Figure 6A:
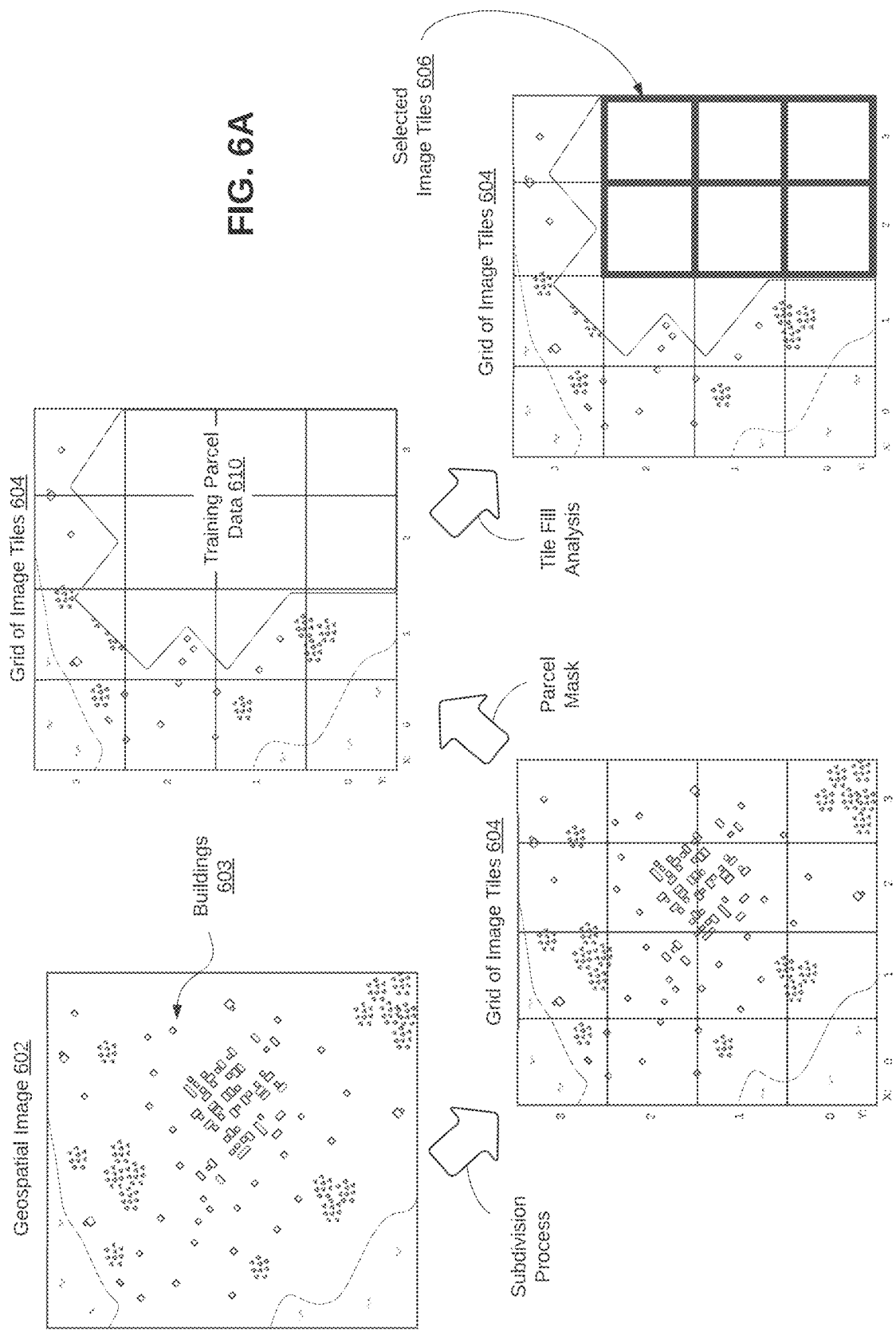
FIG. 6A illustrates certain aspects of an example process by which geospatial imagery and ground truth parcel data are combined to form a set of training data for artificial parcel generation.
Figure 6B:
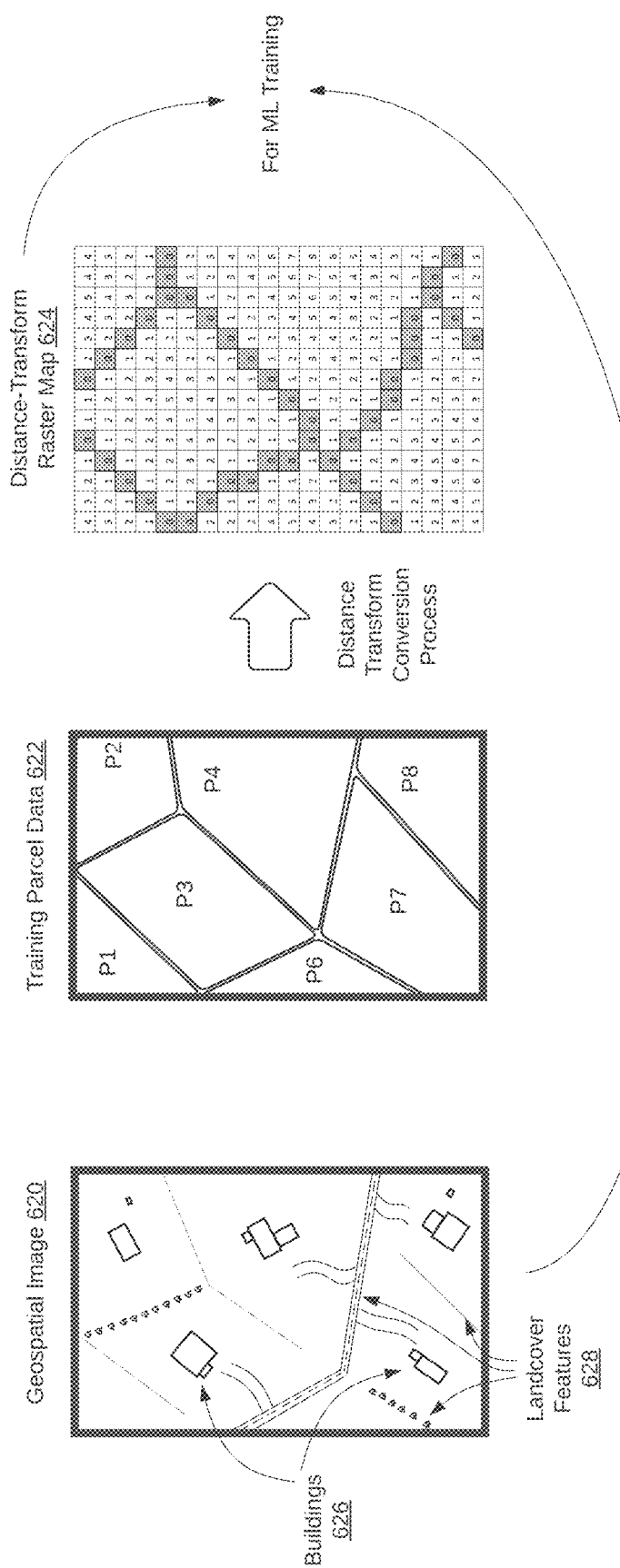
FIG. 6B illustrates, in greater detail, certain aspects of the process of FIG. 6A, by which geospatial imagery and ground truth parcel data are combined to form a set of training data for artificial parcel generation.

For illustrative purposes, reference may be had to FIG. 6B, which shows a geospatial image 620 corresponding to the selected image tiles 606 of FIG. 6A and the corresponding training parcel data 622 that covers the same geospatial area. FIG. 6B further shows a distance-transform raster map 624 generated by converting the training parcel data 622 in the manner described above. As can be seen, pixels corresponding to the boundary between adjacent pixels are labeled as zero, and pixels inside parcels are labeled with positive integers indicating the distance, measured in pixels, to the nearest parcel boundary. Since the geospatial image 620 is entirely filled with parcel data, there are no negatively-attributed pixels indicating areas without parcel coverage. The resulting geospatial image 620 and distance-transform raster map 624 may be provided as training data for a machine learning model (e.g., machine learning model 420 of FIG. 4).

It should be noted that, for illustrative purposes only, the distance-transform raster map 624 is depicted here as being downsampled to a lower resolution than the geospatial image 620. In some cases, downsampling may be preferred, however, in other cases, the distance-transform raster map 624 may be generated to match the resolution of the geospatial image 620.

It should also be appreciated that the geospatial image 620 depicts several buildings 626 for which artificial parcel data is to be generated. Further, the geospatial image 620 depicts several landcover features 628 that may mark the boundaries of legal land parcels, including roads, fences, and tree lines. As discussed above, although the boundaries of legal land parcels are not directly observable, legal land parcels tend to be marked by such landcover features. Generally, the landcover features that tend to mark parcel boundaries are linear in nature and therefore can serve as a basis for modeling an edge of a polygon representing a legal land parcel. Given a sufficient training set for a particular neighborhood context, a machine learning model may learn to identify the features that typically mark parcel boundaries in such a context. For example, in the rural context, the machine learning model may recognize that the legal land parcel boundaries of farms tend to be marked by roads, tree lines, changes in crop type or crop condition from one field to the next, and natural features such as rivers and streams. In the suburban context, the machine learning model may recognize that the legal land parcel boundaries of suburban homes tend to be marked by roads, backyard fences, and shrubs. In the urban context, the machine learning model may recognize that the legal land parcel boundaries of adjacent townhomes are typically marked by roads, differences in roof structure of adjacent townhomes, and the like.

Further, since parcel data generally includes one parcel per building, the machine learning model, once trained, will be configured to generate one parcel for each of the buildings in the geospatial imagery provided. Depending on the characteristics of the training data, it can be expected that each artificially-generated parcel will be approximately centered around the building for which the parcel is being generated, with the building roughly centered in the middle of the parcel, taking into account the landcover features that tend to mark parcel boundaries.

Returning to FIG. 5, at operation 510, the machine learning model is trained with the distance-transform raster map and corresponding training imagery to generate distance-transform raster map representations of artificial parcel data based on geospatial imagery. The machine learning model may be trained according to any suitable training methods such as stochastic gradient descent, and involving any suitable techniques such as dropout, and under any suitable set of machine learning parameters. A Softmax may be used to convert the output of the machine learning model to a probability distribution to simplify the output and for computing loss versus ground truth parcel data set.

In summary, the machine learning model therefore takes as input the geospatial imagery (typically comprising RGB channels) and processes these channels through a convolutional neural network, U-Net, or other appropriate deep learning architecture, to learn associations between the visual features depicted in the geospatial imagery and the distance-transform form of ground truth parcel data, thereby enabling the machine learning model to infer new distance-transform raster maps when presented with new geospatial imagery.

It is to be noted that the method 500 and/or any of its operations may be embodied in non-transitory machine-readable programming instructions executable by one or more processors of one or more computing devices, such as servers in a cloud computing environment, which include memory to store programming instructions that embody the functionality described herein and one or more processors to execute the programming instructions.

Figure 7:
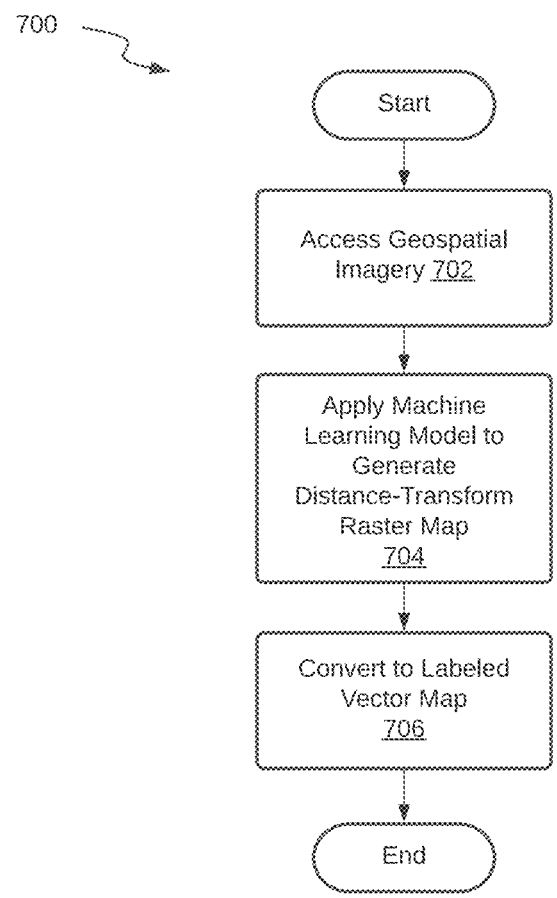
FIG. 7 is a flowchart of an example method for generating artificial parcel data in the form of a labeled vector map from geospatial imagery.

FIG. 7 is a flowchart of an example method 700 for generating artificial parcel data in the form of a labeled vector map from geospatial imagery. The method 700 may be understood as describing one example of how the artificial parcel generator 400 of FIG. 4 may be operated. The method 700 involves providing areas of geospatial imagery where artificial parcel data is to be generated to a machine learning model, which generates artificial parcel data in the form of a distance-transform raster map, which is then converted into a labeled vector map.

At operation 702, geospatial imagery depicting one or more buildings, for which artificial parcel data is to be generated, and the surrounding areas, is accessed. The buildings for which artificial parcel data is to be generated may have been identified as those for which ground truth parcel data is not available, as described in the method 200 of FIG. 2. As described in the method 200, the geospatial imagery may be provided in the form of one or more image tiles.

At operation 704, a machine learning model is applied to the geospatial imagery to generate artificial parcel data in the form of a distance-transform raster map that represents the legal land parcels for each of the buildings for which artificial parcel data is to be created. As described above, the machine learning model is trained on geospatial imagery depicting buildings and the areas surrounding those buildings, and on the ground truth parcel data indicating the boundaries of the legal land parcels occupied by those buildings.

Since the distance-transform raster map is generated from geospatial imagery containing geospatial coordinate information, this geospatial information may be retained following generation of the distance-transform raster map. In other words, the geospatial coordinates of the geospatial imagery (whether in the form of corner points for single images or an orthorectified set of geospatial coordinates for an orthomosaic) may be carried through to the distance-transform raster map.

It should be noted at this stage that in some cases the areas covered by geospatial imagery that is being processed may have no associated ground truth parcel data, in which case the machine learning model may proceed to generate artificial parcel data over the entire geospatial imagery provided. However, in other cases, the geospatial imagery that is being processed may include at least some areas where ground truth parcel data is already available. In such cases, the machine learning model may be prevented from generating artificial parcel data over such areas (e.g., by applying a mask to the geospatial imagery prior to processing by the machine learning model), or, alternatively, the machine learning model may be allowed to generate artificial parcel data over such areas, only to be removed and/or overridden when merged with the ground truth parcel data at a later stage.

Figure 8:
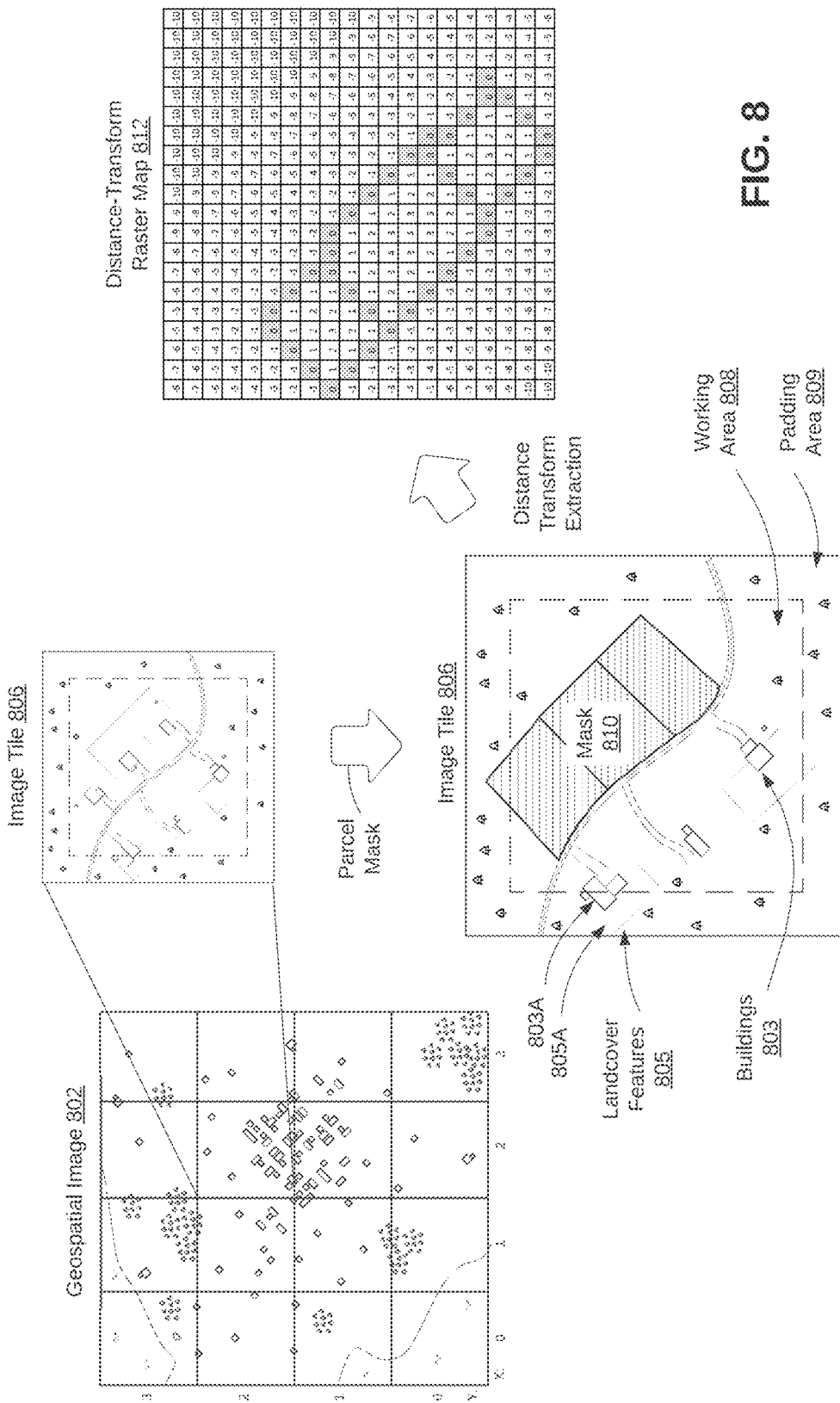
FIG. 8 illustrates certain aspects of an example process by which artificial parcel data in the form of a distance transform raster map is extracted from geospatial imagery.

For illustrative purposes, reference may be had to FIG. 8, which shows a geospatial image 802 depicting several buildings and surrounding areas, including some buildings for which artificial parcel data is to be generated. As shown here, the geospatial image 802 is subdivided into a grid of image tiles as described above. One image tile 806 is shown in close-up for greater detail, showing several buildings 803 and landcover features 805 that tend to mark legal land parcel boundaries (in this case, roads and fences).

It should be appreciated that the image tile 806 includes a working area 808 and a padding area 809 (as described in FIG. 3A) which provides additional context for generating artificial parcel data. Most particularly, it can be seen that building 803A lies on the boundary of the working area 808 of the image tile 806, and there is a nearby fence 805A that extends into the padding area 809 of the image tile 806 that may demarcate at least a portion of the legal land parcel of the building 803A.

The image tile 806 is further shown masked by a mask 810 corresponding to ground truth parcel data that is available for some of the buildings depicted in the image tile 806. As described above, this mask 810 is shown for illustrative purposes only, as in some cases, as described above, the machine learning model may be permitted to view such areas of the image tile 806 during inferencing. In such cases, any artificially generated parcel data that overlaps with ground truth parcel data may be overwritten by ground truth parcel data.

It should also be noted here that in some examples, an output from the machine learning model that falls below a threshold confidence level may be excluded from the resulting artificially-generated parcel dataset. In other examples, the entire output of the machine learning model may be used, and corrected in post-processing where necessary.

FIG. 8 also shows the distance-transform raster map 812 that is extracted from the image tile 806. As can be seen, three legal land parcels corresponding to the three buildings 803 depicted in the image tile 806 are outlined in the distance-transform raster map 812 (i.e., pixel boundaries labeled with zeros), whereas pixels labeled with positive integers are situated inside such parcels, and pixels labeled with negative integers are situated outside such parcels.

Returning to FIG. 7, at operation 706, the distance-transform raster map is finally converted into a vector map containing one or more polygons that represent the boundaries of each of the artificially-generated legal land parcels. Details of this process are provided in FIG. 9, below. It should be noted that since the vector map is generated from a distance-transform raster map for which geospatial coordinate information was retained, the resulting vector map may also retain such geospatial information.

Following conversion to a vector map, the artificial parcel data may be associated with other relevant data. For example, building footprint data (i.e., comprising polygons representing the shapes and locations of the one or more buildings depicted in the geospatial imagery) can be obtained, and each artificial parcel polygon can be associated with the appropriate building represented in the building footprint data. Further, derivative data can be calculated from the parcel polygon and/or building footprint polygon, such as parcel dimensions, parcel area, parcel frontage, building footprint dimensions, building footprint area, and other data. Such data can be combined with address data or other property data to form a comprehensive package of geospatial data pertaining to a property of interest.

Figure 9:
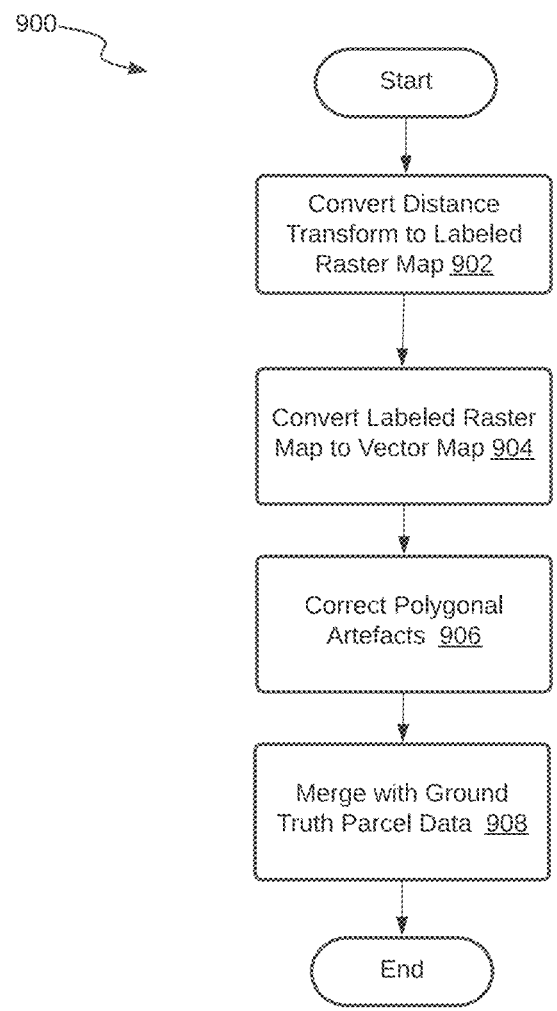
FIG. 9 is a flowchart of an example method for converting artificial parcel data, in the form of a distance transform raster map, into a labeled vector map.

FIG. 9 is a flowchart of an example method 900 for converting artificial parcel data in the form of a distance transform raster map into a labeled vector map. The method 900 may be understood as one example of how the operation 706 of the method 700 of FIG. 7 may operate, or how the vector map conversion unit 430 of FIG. 4 may operate.

At operation 902, the distance-transform raster map is converted to an instance-labeled raster map. An instance-labeled raster map is a raster map with each pixel labeled as belonging to a particular artificially-generated parcel (or no parcel). The instance-labeled raster map may be generated by performing an instance segmentation process on the distance-transform raster map. One example of an instance segmentation process that may be performed on the distance-transform raster map is a watershed algorithm. In the case of applying the watershed algorithm, basins may be located at substantially the center of each distinct legal land parcel, which, in the distance-transform raster map, can be determined as coinciding with the pixels attributed with the highest distance values.

As mentioned above, the labeled raster map is labeled with each pixel attributed as belonging to a particular parcel. For example, a parcel area belonging to a first building may be labeled with the integer "1", another is labeled with the integer "2", and so on. In the labeled raster map, pixels that are not meant to be part of any artificially generated parcel may be labeled as such, for example, with the integer "0". For example, in cases where the geospatial imagery being processed by the machine learning model contains ground truth parcel data, the areas corresponding to the ground truth parcel data can be labeled accordingly and removed from the artificially-generated parcel data set.

Figure 10:
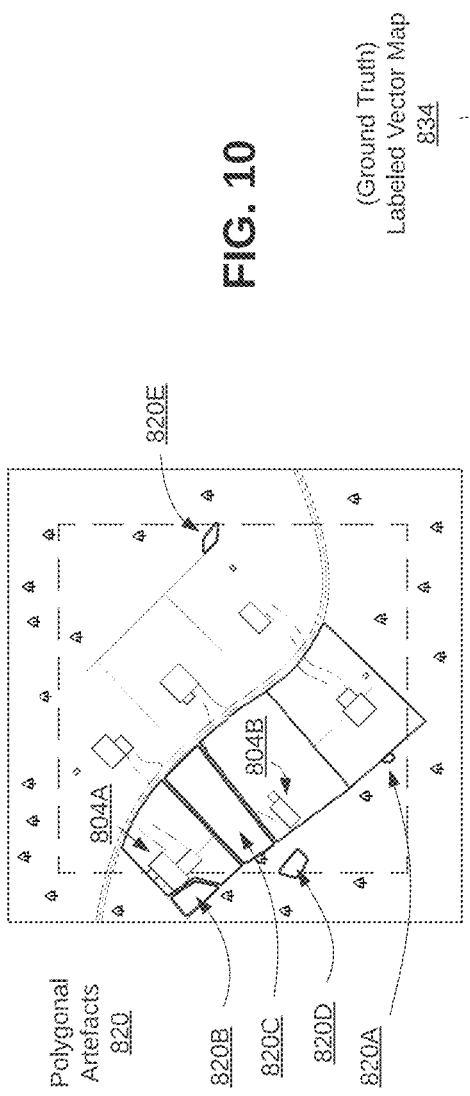
FIG. 10 illustrates certain aspects of a method for converting artificial parcel data, in the form of a distance transform raster map, into a labeled vector map, as applied to example geospatial imagery.
Figure 10:
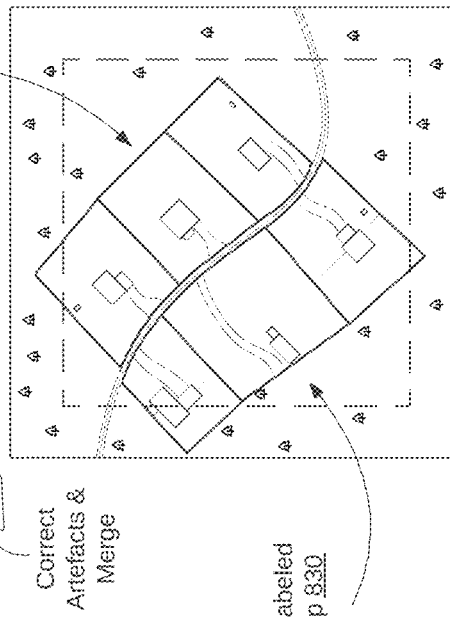
Figure 10:
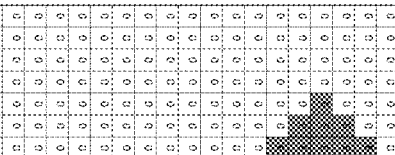
Figure 10:
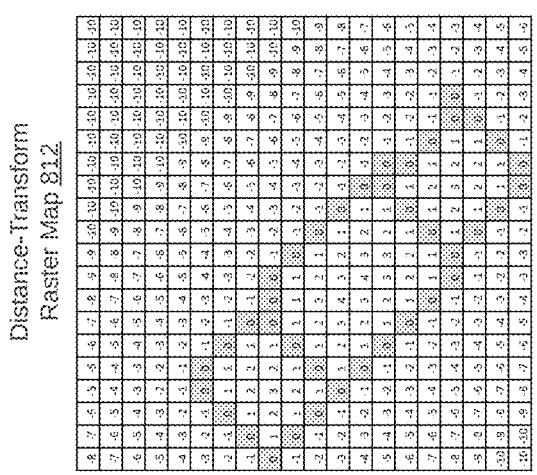
Figure 10:
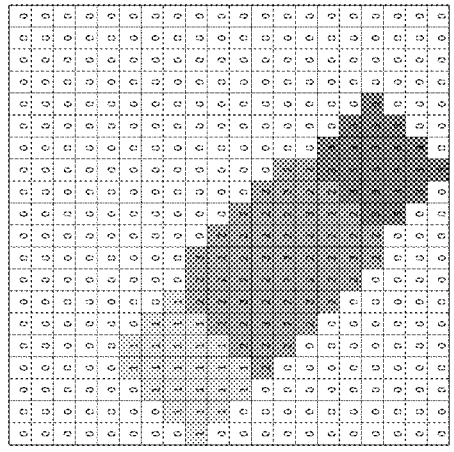

For illustrative purposes, reference may be had to FIG. 10, which shows the distance-transform raster map 812, and a labeled raster map 814 converted from the distance-transform raster map 812. The three parcels identified in the distance-transform raster map 812 are labeled with the integers "1", "2", and "3", respectively, with un-parceled areas labeled as "0". In other examples, however, it is to be understood that the machine learning model may generate parcel data across the entire image tile, some of which may be removed or overridden in later stages.

In some cases, the parcel label raster map may be used as-is for cases in which labeled parcel data in the raster format is preferred. However, in most cases, the parcel label raster map will undergo conversion to a vector map. Optionally, a smoothing algorithm may be performed on the parcel label raster map to smooth or simplify jagged lines or protrusions or other elements that are not likely to accurately reflect actual legal land parcel boundaries.

At operation 904, the labeled raster map is converted to a labeled vector map. The conversion of raster data to vector data may be performed according to any suitable algorithm. The result is a labeled vector map that includes a polygon for each of the distinct legal land parcels represented in the artificial parcel data, each labeled with a unique identifier. Further, since the vector map was generated from a distance-transform raster map for which geospatial coordinate information was retained, the resulting vector map may also retain such geospatial information. For example, each polygon may be attributed with geospatial coordinates (e.g., each vertex of the polygon being attributed with geospatial coordinates).

At operation 906, optionally, any polygonal artefacts that may be present in the resulting vector map may be corrected. For example, small polygons that are too small to represent legal land parcels may be deemed polygonal artefacts and removed or merged with neighbouring polygons.

For illustrative purposes, reference may be had to FIG. 10, which shows a labeled vector map 830, generated from the labeled raster map 814. The labeled vector map 830 is depicted as containing several polygonal artefacts 820. Although such polygonal artefacts 820 would not have been suggested in the labeled raster map 814, they are depicted here to illustrate the kinds of polygonal artefacts 820 that may form.

As part of the polygonal artefact correction process, as a preliminary step, it may be determined whether any polygonal artefacts are present in the labeled vector map at all. This determination may be made by an analysis of the labeled vector map alone, or may be made with reference to the labeled vector map and other data sets, such as building footprint data and ground truth parcel data available in the area. One way in which a polygonal artefact may be identified is by identifying that a polygon in the labeled vector map does not appear to belong to any building represented in building footprint data. For example, any polygon in the labeled vector map that does not geospatially overlap with any building footprint data may be deemed a polygonal artefact, and analyzed further. Such polygonal artefacts may be made subject to corrective action, such as being merged or discarded. In FIG. 10, several polygonal artefacts 820A, 820B, 820C, 820D, and 820E that meet this criteria are indicated.

The corrective action to be taken for any given polygonal artefact may be determined by evaluating one or more criteria, which may involve consideration of one or more data sources, including the labeled vector map itself, any ground truth parcel data in the area, and any building footprint data available in the area. Some possible corrective actions include merging a polygonal artefact with other artificial parcel data represented in the labeled vector map, discarding an polygonal artefact entirely, or other corrective action.

As one example of a corrective action, a polygonal artefact may be discarded based on its size alone. If the polygonal artefact is smaller than a predetermined threshold value (below which the polygon is not likely to represent a legal land parcel), the polygonal may be deemed too small to merge with any neighbouring polygons, and discarded entirely. With reference to FIG. 10, polygonal artefact 820A may be discarded for being below a threshold size.

As another example of a corrective action, a polygonal artefact may be merged with a neighbouring polygon based on a combination of its size and/or adjacency to other polygons. For example, if a polygonal artefact is larger than the predetermined threshold value to be discarded, but does not overlap with any building footprint, the polygonal artefact may be merged with an adjacent polygon. With reference to FIG. 10, polygonal artefact 820B may be merged with the adjacent polygon occupied by building 804A. In cases where the polygonal artefact is adjacent to more than one other polygon, further criteria such as proximity to the nearest building footprint may be evaluated to determine which polygon the polygonal artefact is to be merged with. With reference to FIG. 10, polygonal artefact 820C may be merged with the polygon occupied by building 804B based on proximity.

As yet another example of a corrective action, a polygonal artefact may be discarded if it is not adjacent to any artificially-generated parcel, regardless of its size. With reference to FIG. 10, polygonal artefact 820D may be discarded for this reason. Similarly, polygonal artefact 820E, although adjacent to ground truth parcel data, may be discarded for the same reason. Indeed, merging polygonal artefacts in artificial parcel data with ground truth parcels may be avoided, as it is usually prudent to assume that ground truth parcel data is complete and accurate.

Returning to FIG. 9, at operation 908, the labeled parcel map may be merged with ground truth parcel data. For illustrative purposes, reference may be had to FIG. 10, which shows a merged vector map 832, comprising the (artificial) labeled vector map 830 and (ground truth) labeled vector map 834. In the present case, although only the parcel data for the six depicted buildings are shown, it is to be understood that in the general case, the entire geospatial imagery will be filled with parcel data, whether ground truth data or artificially-generated.

It is to be noted that the method 900 and/or any of its operations may be embodied in non-transitory machine-readable programming instructions executable by one or more processors of one or more computing devices, such as servers in a cloud computing environment, which include memory to store programming instructions that embody the functionality described herein and one or more processors to execute the programming instructions.

In summary, it should therefore be seen that artificial parcel data can be generated by applying machine learning methods to geospatial imagery for the purposes of providing artificially-generated parcel data where no ground truth parcel data is available. A machine learning model such as the one described herein may be particularly well suited to capture the visible landcover features that tend to demarcate legal land parcel boundaries, including across a wide range of contexts, such as urban, rural, and suburban, and at a large scale. Further, it should be seen that large areas of geospatial imagery can be efficiently processed and selected for artificial parcel generation by cross-referencing ground truth parcel data sets with building footprint data sets.

As described above, such a machine learning model may be trained on geospatial imagery and the ground truth parcel data covering the corresponding areas captured in the geospatial imagery. In some examples, the machine learning model may be trained to attend to more than simply the spectral information encoded in the geospatial imagery provided (e.g., RGB), but further, may be trained to attend to additional datasets, such as, for example, a building footprint dataset (e.g., as another data channel alongside spectral data), so that the machine learning model may be more rigorously trained to generate artificial data that is more centered around known building footprint data.

Artificial parcel data may be useful in any case where ground truth parcel data is unavailable from an official source. One example use case is in a geocoding system servicing a large geographic area including some areas where no ground truth parcel data is available. In such a geocoding system, artificial parcel data and building footprint data for buildings may be stored in association with addresses or other identifiers of buildings (e.g., as another functional unit run by the one or more data processing devices 120 of FIG. 1). Such data may be provided in response to a query identifying a particular building (e.g., by the building address or geospatial coordinates that fall within a building footprint or artificial parcel). Such a geocoding system may combine artificial parcel data with ground truth parcel data to fill in gaps where ground truth parcel data is not available. Such a geocoding system may be particularly useful to an insurance company performing property assessments of a property that may involve consideration of parcel data that may not otherwise be available. Such a geocoding system may be made available to devices making such queries through an Application Programming Interface (API) or other suitable platform.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method for preparing training data to train a machine learning model to generate artificial parcel data, the method comprising:
   accessing training imagery, the training imagery comprising geospatial imagery covering a geographic area;
   subdividing the training imagery into a grid of image tiles;
   accessing training parcel data, the training parcel data comprising ground truth parcel data representing known legal land parcels in at least some of the area covered by the training imagery;
   cross-referencing the training parcel data with the training imagery to identify image tiles that are filled with training parcel data;
   selecting, based on the cross-referencing, one or more image tiles that are to be used for machine learning;
   converting the training parcel data within the selected image tiles into a distance-transform raster map that represents the distance from each pixel of the raster map to the nearest boundary of a legal land parcel; and
   training the machine learning model with the distance-transform raster map and associated training imagery to generate distance-transform raster map representations of artificial parcel data based on geospatial imagery.

2. The method of claim 1, wherein the machine learning model comprises a U-Net convolutional neural network.

3. The method of claim 1, wherein:
   the geospatial imagery depicts a building; and
   the training parcel data includes ground truth parcel data representing a known legal land parcel associated with the building.

4. The method of claim 1, wherein training the machine learning model causes the machine learning model to learn to recognize landcover features visible in geospatial imagery that tend to mark boundaries of legal land parcels.

5. The method of claim 1, wherein selecting the image tiles that are to be used for machine learning comprises:
   selecting the image tiles which are entirely filled with training parcel data.

6. The method of claim 1, wherein selecting the image tiles that are to be used for machine learning comprises:
   selecting the image tiles which are entirely filled with training parcel data and the image tiles which are partly filled with training parcel data above a threshold.

7. The method of claim 1, wherein converting the training parcel data within the selected image tiles into the distance-transform raster map comprises:
   labeling each pixel of the distance-transform raster map with a distance to a nearest boundary of a legal land parcel, wherein the distance is truncated beyond a threshold value.

8. A system for preparing training data to train at least one machine learning model to generate artificial parcel data, the system comprising one or more computing devices configured to:
   obtain training imagery, the training imagery comprising geospatial imagery covering a geographic area;
   subdivide the training imagery into a grid of image tiles;
   obtain training parcel data, the training parcel data comprising ground truth parcel data representing known legal land parcels in at least some of the geographic area covered by the training imagery;
   cross-reference the training parcel data with the training imagery to identify image tiles that are filled with training parcel data;
   select, based on the cross-referencing, one or more image tiles that are to be used for machine learning;
   convert the training parcel data within the one or more selected image tiles into a distance-transform raster map that represents a distance from each pixel of the distance-transform raster map to a nearest boundary of a legal land parcel; and
   train the at least one machine learning model with the distance-transform raster map and associated training imagery to generate distance-transform raster map representations of artificial parcel data based on geospatial imagery.

9. The system of claim 8, wherein the at least one machine learning model comprises a U-Net convolutional neural network.

10. The system of claim 8, wherein:
    the geospatial imagery depicts a building; and
    the training parcel data includes ground truth parcel data representing a known legal land parcel associated with the building.

11. The system of claim 8, wherein training the at least one machine learning model causes the at least one machine learning model to learn to recognize landcover features visible in geospatial imagery that tend to mark boundaries of legal land parcels.

12. The system of claim 8, wherein selecting the image tiles that are to be used for machine learning comprises:
    selecting the image tiles which are entirely filled with training parcel data.

13. The system of claim 8, wherein selecting the image tiles that are to be used for machine learning comprises:
    selecting the image tiles which are entirely filled with training parcel data and the image tiles which are partly filled with training parcel data above a threshold.

14. The system of claim 8, wherein converting the training parcel data within the one or more selected image tiles into the distance-transform raster map comprises:
    labeling each pixel of the distance-transform raster map with a distance to a nearest boundary of a legal land parcel, wherein the distance is truncated beyond a threshold value.

15. At least one non-transitory machine-readable storage medium comprising instructions that when executed cause one or more processors to:
    obtain training imagery, the training imagery comprising geospatial imagery covering a geographic area;
    subdivide the training imagery into a grid of image tiles;
    obtain training parcel data, the training parcel data comprising ground truth parcel data representing known legal land parcels in at least some of the geographic area covered by the training imagery;
    cross-reference the training parcel data with the training imagery to identify image tiles that are filled with training parcel data;
    select, based on the cross-referencing, one or more image tiles that are to be used for machine learning;
    convert the training parcel data within the selected image tiles into a distance-transform raster map that represents a distance from each pixel of the raster map to a nearest boundary of a legal land parcel; and
    train a machine learning model with the distance-transform raster map and associated training imagery to generate distance-transform raster map representations of artificial parcel data based on geospatial imagery.

16. The at least one non-transitory machine-readable storage medium of claim 15, wherein the machine learning model comprises a U-Net convolutional neural network.

17. The at least one non-transitory machine-readable storage medium of claim 15, wherein:
- the geospatial imagery depicts a building; and
- the training parcel data includes ground truth parcel data representing a known legal land parcel associated with the building.

18. The at least one non-transitory machine-readable storage medium of claim 15, wherein training the machine learning model causes the machine learning model to learn to recognize landcover features visible in geospatial imagery that tend to mark boundaries of legal land parcels.

19. The at least one non-transitory machine-readable storage medium of claim 15, wherein selecting the image tiles that are to be used for machine learning comprises:
- selecting the image tiles which are entirely filled with training parcel data.

20. The at least one non-transitory machine-readable storage medium of claim 15, wherein selecting the image tiles that are to be used for machine learning comprises:
- selecting the image tiles which are entirely filled with training parcel data and the image tiles which are partly filled with training parcel data above a threshold.

21. The at least one non-transitory machine-readable storage medium of claim 15, wherein converting the training parcel data within the one or more selected image tiles into the distance-transform raster map comprises:
- labeling each pixel of the distance-transform raster map with a distance to a nearest boundary of a legal land parcel, wherein the distance is truncated beyond a threshold value.

* * * * *